(12) United States Patent
Kern et al.

(10) Patent No.: US 6,181,028 B1
(45) Date of Patent: Jan. 30, 2001

(54) TRANSFER MECHANISM FOR TRANSFERRING POWER BETWEEN A UTILITY SOURCE AND A STAND-BY GENERATOR

(75) Inventors: Robert D. Kern, Waukesha; Gerald C. Ruehlow, Oconomowoc; Francis X. Wedel, Lake Mills; Jeffrey J. Jonas, Waukesha; John G. Bagley, Dousman; Steven J. Wilcox, Wales, all of WI (US)

(73) Assignee: Generac Power Systems, Inc., Waukesha, WI (US)

(*) Notice: Under 35 U.S.C. 154(b), the term of this patent shall be extended for 0 days.

(21) Appl. No.: 09/377,722

(22) Filed: Aug. 19, 1999

(51) Int. Cl.[7] ........................................... H02J 7/14
(52) U.S. Cl. ................................. 307/64; 361/20
(58) Field of Search ...................... 307/66, 65, 64, 307/70, 80, 81, 85, 86, 116, 125, 130, 139, 141; 361/20

(56) References Cited

U.S. PATENT DOCUMENTS

| | | | |
|---|---|---|---|
| 3,607,644 | 9/1971 | Agazzi et al. | |
| 5,579,197 | * 11/1996 | Mengelt et al. | 361/93 |
| 5,646,458 | * 7/1997 | Bowyer | 307/67 |
| 5,767,591 | * 6/1998 | Pinkerton | 307/64 |
| 5,895,981 | 4/1999 | Flegel. | |
| 5,939,802 | * 8/1999 | Hoenbeck | 307/87 |

\* cited by examiner

Primary Examiner—Albert W. Paladini
Assistant Examiner—Robert Deberadinis
(74) Attorney, Agent, or Firm—Jansson, Shupe, Bridge & Munger, Ltd.

(57) ABSTRACT

A transfer mechanism is provided for transferring the supply of power between a generator and utility source. The transfer mechanism includes a monitoring system for monitoring the power supplied by the utility source. The monitoring system starts the generator in response to a power outage from the utility source and stops the generator in response to the restoration of power from the utility source. A power relay has a utility input connectable to the utility source, a generator input connectable to the generator, an output connectable to a load, and a movable contact for selectively interconnecting one of the inputs to the output in response to the generation of power by the generator.

20 Claims, 4 Drawing Sheets

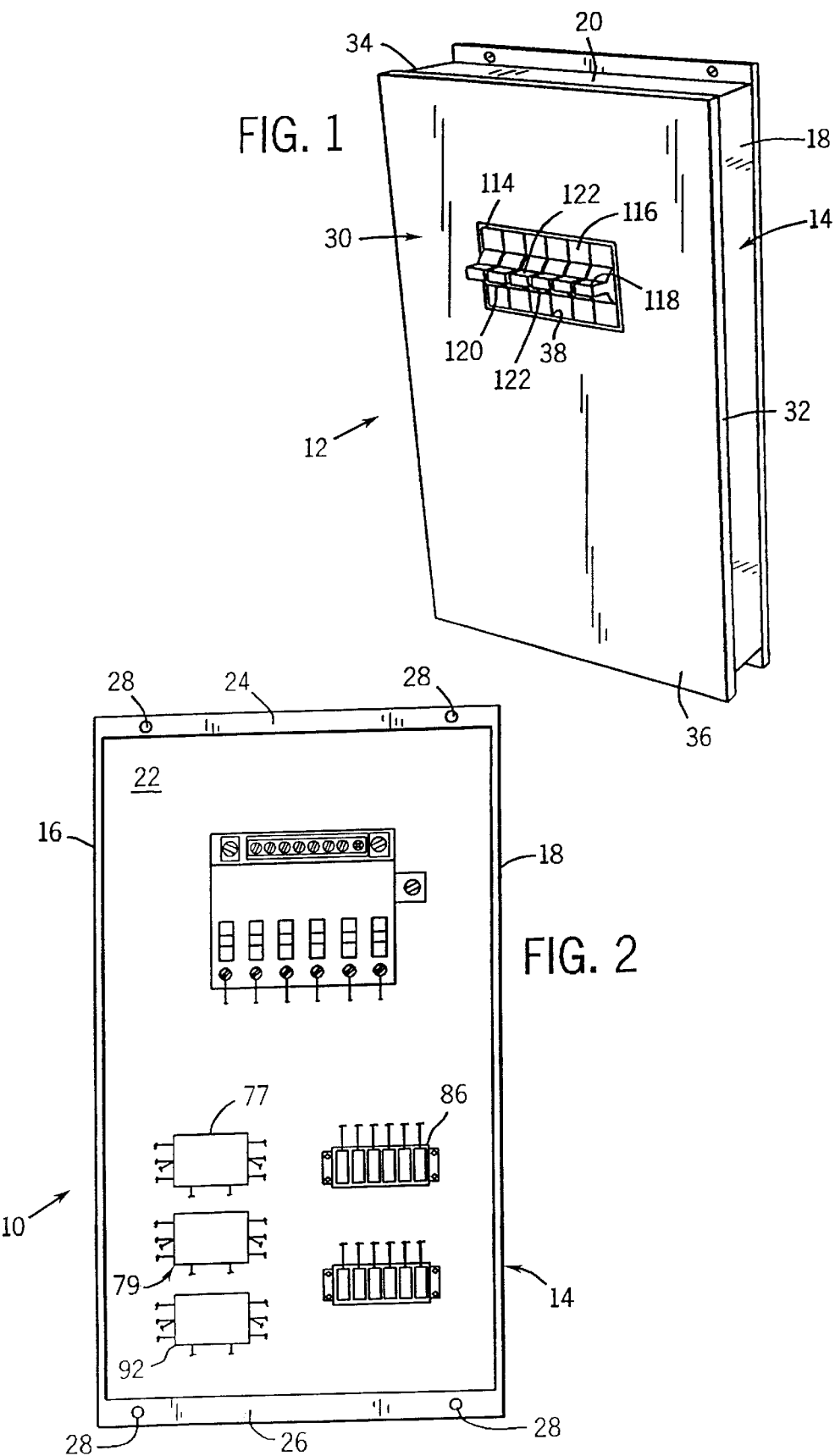

TRANSFER MECHANISM FOR TRANSFERRING POWER BETWEEN A UTILITY SOURCE AND A STAND-BY GENERATOR

FIELD OF THE INVENTION

This invention relates to stand-by generators, in particular, to a transfer mechanism for transferring the supply of power between a utility source and a stand-by generator.

BACKGROUND OF THE INVENTION

As is known, virtually all facilities which utilize electric power receive such power from a utility company. Typically, such utility companies have an excellent record of providing uninterrupted or infrequently interrupted power at proper voltage levels and line frequency. However, due to the increasing demands for power, power outages have become more frequent. While such outages usually last for a only a short duration, an extended power outage may cause more than simple aggravation for customers of the utility company. By way of example, for a residential customer, any power outage renders a home owner's sump pump inoperable. If a power outage occurs during a rain storm, it is quite possible that the failure of the sump pump to operate will result in the flooding of a home owner's basement.

In order to overcome these occasional disruptions in service, various customers, including home owners, have equipped their facilities with stand-by power systems. These stand-by power systems include internal combustion engines which drive electrical generators. If the commercial power from the utility company fails, the internal combustion engine is automatically started causing the electrical generator to generate power. When the power generated by the generator reaches the voltage and frequency desired by the customer, a manually operated transfer switch transfers the load imposed by the customer from the commercial power lines to the generator.

Typically, the transfer mechanism incorporates a switch which isolates the power supplied by the utility company and the generator. In a residential application, a home owner manually flips a switch between the utility source and the generator in order to provide power to the electrical system of the home. However, due to a potential time delay before the home owner can flip the switch, a significant amount of damage may be sustained by a home owner before power is supplied to the electrical system of the home. For example, an extended power outage may result in foodstuffs spoiling within a refrigerator or melting within a freezer. Therefore, it is highly desirable to provide a transfer mechanism which automatically transfers power from the utility company to the generator whenever the generator is activated.

Further, prior art transfer mechanisms require a home owner to transfer the entire electrical system of the home onto the generator. Such an arrangement does not allow a home owner the ability to decide which circuits of a home's electrical system to be powered. As such, it is also desirable to provide a transfer mechanism which allows various branch circuits of a home to be brought on line separately, rather than at once, to allow for loads with large starting requirements to be brought up to speed before bringing the other circuit branches of the home on line thereby insuring that adequate power is provided by the generator to start such loads.

Therefore, it is a primary object and feature of the present invention to provide a transfer mechanism for transferring power between a utility source and a stand-by generator.

It is a further object and feature of the present invention to provide a transfer mechanism which automatically transfers power from the utility source to the generator in response to a power outage.

It is a still further object and feature of the present invention to provide a transfer mechanism for transferring power between a utility source and a generator which allows for the bringing of individual circuit branches of a home electrical system on line separately.

It is a still further object and feature of the present invention to provide a transfer mechanism which is simple to install and inexpensive to manufacture.

SUMMARY OF THE INVENTION

An improvement in a transfer mechanism for transferring the supply of power to a load between a generator which generates power when started, and a utility source is provided. The transfer mechanism monitors the power supplied by the utility source and starts the generator in response to a power outage from the utility source. The improvement comprises a relay having a utility input operatively connected to the utility source, a generator input and a coil operatively connected to the generator, and an output operatively connected to the load. The inputs are selectively connected to the output in response to the application of power to the coil by the generator.

It is contemplated to provide a circuit breaker to interconnect the generator to the generator input of the relay. The circuit breaker includes a first setting which isolates the generator input from the generator and a second setting which protects the relay against an overload by the generator. The relay may include a movable contact which is movable between a first position which interconnects the utility input and the output and a second position which connects the generator input and the output. In response to the application of power to the coil, the movable contact moves into the second position.

The relay may also include a time delay switch interconnecting the generator and the coil of the relay. The time delay switch delays application of power through the coil so as to delay movement of the movable contact to the second position. The relay may also include a second utility input operatively connected to the utility source, a second generator input and a second coil operatively connected to a generator, and a second output operatively connected to the second load. The second inputs are selectively connected to the second output in response to application of power to the second coil by the generator.

In accordance with a still further aspect of the present invention, a transfer mechanism is provided for transferring a supply of power between a generator and a utility source. The transfer mechanism includes a monitoring system for monitoring the power supplied by the utility source. The monitoring system starts the generator in response to a power outage from the utility source and stops the generator in response to the restoration of the power from the utility source. An electromagnetic switch is also provided. The electromagnetic switch includes a utility input connectable to the utility source, a generator input connectable to the generator, an output connected to a load, and a movable contact for selectively interconnecting one of the inputs to the output in response to the generation of power by the generator.

A generator circuit breaker interconnects the generator to the generator intput of the electromagnetic switch. The generator circuit breaker has a first setting which isolates the generator input from the generator and a second setting which protects the electromagnetic switch from an overload by a generator. The movable contact is movable between a first position interconnecting the utility input and the output and a second position interconnecting a generator input and output. A selection structure is provided for moving the contact between the first and second positions. The selection structure includes the coil operatively connected to the generator. The coil urges the movable contact to the second position in response to the generation of power by the coil. When a generator is stopped, the selection structure urges the movable contact to the first position. A time delay switch interconnects the generator and the coil of the electromagnetic switch. The time delay switch delays the supply of power to the generator to the load at the starting of the generator by the monitoring system.

It is contemplated to provide a utility circuit breaker to interconnect the utility source to the utility input of the electromagnetic switch. The utility circuit breaker has a first setting which isolates the utility input from the utility source and a second setting which protects the electromagnetic switch against the overload from the utility source. A second electromagnetic switch may also be provided. The second electromagnetic switch includes a second utility input connectable to the utility source, a generator input connectable to the generator, an output connected to a second load, and a movable contact for selectively interconnecting one of the second inputs to the output in response to the generation of power by the generator.

In accordance with a still further aspect of the present invention, a transfer mechanism is provided for transferring the supply of power between a generator which generates power when started and a utility source. The transfer mechanism includes a monitoring system for monitoring the power supplied by the utility source. The monitoring system starts the generator in response to a power outage from the utility source and stops the generator in response to the restoration of power from the utility source. A plurality of relays are also provided. Each relay includes a utility input; a generator input; an output connectable to a corresponding load; a movable contact movable between a first position interconnecting the utility input and the output and a second position interconnecting the generator input and the output; and a coil connectable to the generator. The coil urges the movable contact into the second position in response to the generation of power by the generator. A plurality of generator circuit breakers and utility circuit breakers are also provided. Each generator circuit breaker interconnects the generator to the generator input of a corresponding relay. Each utility circuit breaker interconnects the utility source to the utility input of a corresponding relay.

A plurality of time delay switches interconnect the generator and the coil of a corresponding relay so as to delay the power from the generator to each load when the generator is started. Each time delay switch delays the supply of power to each load for a predetermined period of time such that power is supplied to each load in a predetermined sequential order.

Each relay may also include a biasing structure for biasing the movable contact towards the first position. Further, at least one of the relays may be include a second utility input; a second generator input; a second output connectable to a corresponding load; a second movable contact movable between a first position interconnecting the second utility input and the second output and a second position interconnecting the second generator input and the second output; and a second coil connectable to the generator. The second coil urges the second movable contact into the second position in response to the generation of power by the generator.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1 is an isometric view of an enclosure for a housing transfer mechanism in accordance with the present invention;

FIG. 2 is a front elevational view, with its cover removed, of the enclosure of FIG. 1;

DETAILED DESCRIPTION OF THE INVENTION

Figure 3:
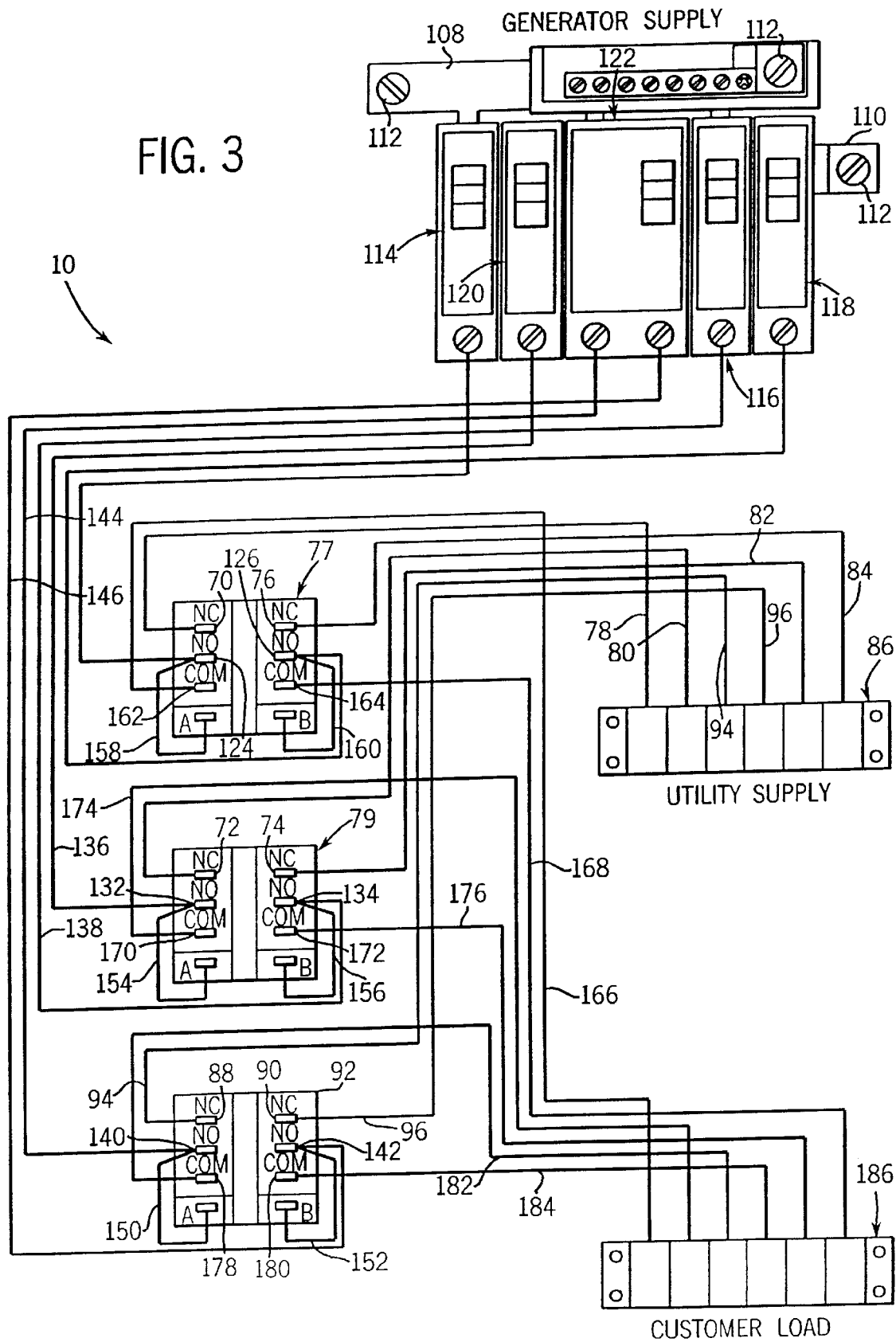
FIG. 3 is a wiring diagram of the transfer mechanism of the present invention.

Referring to FIGS. 2 and 3, a transfer mechanism in accordance with the present invention is generally designated by the reference numeral 10. It is contemplated that the transfer mechanism 10 be mounted within a housing 12, FIGS. 1 and 2. Housing 12 includes a cabinet 14. Cabinet 14 defines a pair of sidewalls 16 and 18, a top wall 20 extending between upper ends of sidewalls 16 and 18, a bottom wall (not shown) extending between and interconnecting the lower ends of sidewalls 16 and 18, and a rear panel 22. Upper and lower mounting flanges 24 and 26 project from opposite ends of rear panel 22 of cabinet 14 and include apertures 28 therein for allowing cabinet 14 to be mounted on a wall within the interior of a building via screws or the like.

Housing 12 further includes a cover 30 defined by a pair of sidewalls 32, a top wall 34 extending between the upper ends of sidewalls 32, a bottom wall (not shown) extending between and interconnecting the lower ends of sidewalls 32, and a front panel 36. The front panel 36 of cover 30 includes an opening 38 therein so as to allow for a plurality of circuit breakers project therethrough, as hereinafter described. Cover 30 may be positioned on cabinet 14 to limit access to transfer mechanism 10 contained therein.

Figure 4:
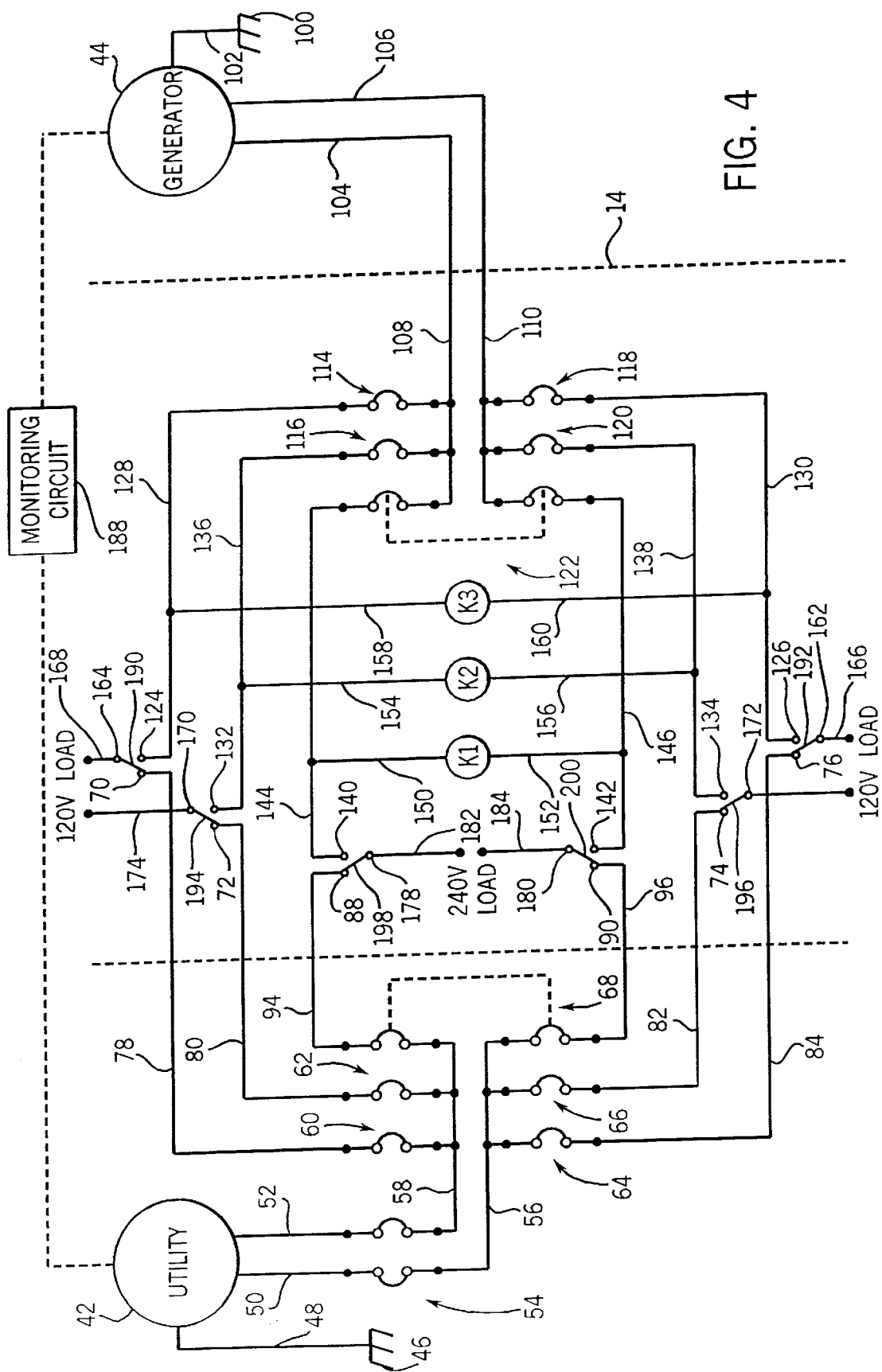
FIG. 4 is a schematic diagram of a first embodiment of the transfer mechanism of the present invention.

Referring to FIG. 4, transfer mechanism 10 is interposed between a utility source 42 and a stand-by generator 44. As is conventional, utility source 42 is interconnected to ground 46 through line 48 and supplies ±120 volts across lines 50 and 52. Lines 50 and 52 are connected to a main circuit breaker 54 within a main distribution panel located in the interior of a building. As is conventional, two bus bars 56 and 58 are connected to main circuit breaker 54. A plurality of single pole circuit breakers 60 and 62 are interconnected to bus bar 58. Similarly, a plurality of single pole circuit breakers 64 and 66 are interconnected to bus bar 56. Circuit breakers 60, 62, 64 and 66 are operatively connected to corresponding individual branch circuits within the building which requires 120 volt service, in a manner hereinafter described. A double pole circuit breaker 68 may be attached to both bus bars 56 and 58. Circuit breaker 68 is operatively connected to a corresponding individual branch circuit which requires 240 volt service, in a manner hereinafter described.

As best seen in FIGS. 3–4, circuit breakers 60 and 64 are interconnected to normally closed contacts 70 and 76, respectively, of a first double pole, double throw power relay 77 through corresponding lines 78 and 84, respectively. Circuit breakers 62 and 66 are interconnected to normally closed contacts 72 and 74, respectively, of a second double pole, double throw power relay 79 through lines 80 and 82, respectively. Double pole circuit breaker 68 is interconnected to normally closed contacts 88 and 90 of a third double pole, double throw power relay 92 through corresponding lines 94 and 96, respectively. Referring to FIGS. 2 and 3, it is contemplated to mount a terminal block 86 to rear panel 22 of cabinet 14 in order to facilitate the connecting of the circuit breakers to the power relays.

As is conventional, circuit breakers 60, 62, 64, 66, and 68 may be toggled between off-positions wherein the corresponding power relays 77, 79 and 92 are isolated from utility source 42 and on-positions wherein the corresponding power relays 77, 79 and 92 are protected from the potential overload by utility source 42.

Generator 44 is interconnected to ground 100 through line 102, and supplies ±120 volts across lines 104 and 106. Lines 104 and 106 are connected to corresponding bus bars 108 and 110, respectively, which are mounted to rear panel 22 of cabinet 14. A plurality of single pole circuit breakers 114 and 116 are interconnected to bus bar 108. Similarly, a plurality of single pole circuit breakers 118 and 120 are interconnected to bus bar 110. Circuit breakers 114, 116, 118, and 120 are operatively connected to corresponding individual branch circuits within the building which require 120 volt service, in a manner hereinafter described. A double-pole circuit breaker 122 is interconnected to both bus bars 108 and 110 and is operatively connected to a corresponding individual branch circuit within the building which requires 240 volt service, in a manner hereinafter described.

Circuit breakers 114 and 118 are interconnected to normally opened contacts 124 and 126, respectively, of power relay 77 by corresponding lines 128 and 130, respectively. Circuit breakers 116 and 120 are interconnected to normally open contacts 132 and 134, respectively, of power relay 79 through corresponding lines 136 and 138, respectively. Double-pole circuit breaker 122 is interconnected to normally open contacts 140 and 142 of relay 92 through corresponding lines 144 and 146, respectively.

As is conventional, circuit breakers 114, 116, 118, 120 and 122 may toggle between off-positions wherein the corresponding power relays 77, 79 and 92 are isolated from generator 44 and on-positions wherein the corresponding power relays 77, 79 and 92 are protected from potential overload by generator 44.

Power relay 92 includes a magnetic coil K1 having terminals A and B. Terminal A of power relay 92 is interconnected to normally open contact 140 by line 150. Terminal B of power relay 92 is interconnected to normally open contact 142 by line 152. Similarly, power relays 77 and 79 include corresponding magnetic coils K3 and K2, respectively, having terminals A and B. Terminal A of power relay 79 is interconnected to normally open contact 132 by line 154. Terminal B of power relay 79 is interconnected to normally opened contact 134 by line 156. Likewise, terminal A of power relay 77 is interconnected to normally open contact 124 by line 158 and terminal B of power relay 77 is interconnected to normally open contact 126 by line 160.

The common terminals 162 and 164 of power relay 77 are connected by lines 166 and 168, respectively, to corresponding individual branch circuits within the building which require 120 volt service. Common terminals 170 and 172 are interconnected by lines 174 and 176, respectively, to corresponding individual branch circuits within the building which also require 120 volt service. Common terminals 178 and 180 of power relay 92 are interconnected by lines 182 and 184, respectively, to a corresponding branch circuit within the building which requires 240 volt service. Referring to FIGS. 2 and 3, it is contemplated to mount a terminal block 186 on rear panel 22 of cabinet 14 in order to facilitate connecting of the common terminals of the power relays to various loads.

Under normal operating circumstances, main circuit breaker 54 and circuit breakers 60, 62, 64, 66 and 68 are toggled to their on-positions. Movable contacts 190 and 192 of power relay 77 are engaged with normally closed contacts 70 and 76, respectively; movable contacts 194 and 196 of power relay 79 are engaged with normally closed contacts 72 and 74, respectively; and movable contacts 198 and 200 of power relay 92 are engaged with normally closed contacts 88 and 90, respectively. As described, utility source 42 provides power on lines 50 and 52 to corresponding loads.

As best seen in FIG. 4, monitoring circuit 188 is operatively connected to the utility source 42 and generator 44. As is conventional, monitoring circuit 188 monitors the power supplied by the utility source 44. In response to a power outage from the utility source 42, monitoring circuit 188 starts the internal combustion engine of the generator 44. As heretofore described, a starting of the internal combustion motor causes the electrical generator of generator 44 to generate electrical power across lines 104 and 106.

With circuit breakers 114 and 118 toggled to their on-positions, current flows through magnetic coil K3 of power relay 77 such that the magnetic coil K3 becomes magnetized and attracts movable contacts 190 and 192 within power relay 77, As a result, movable contacts 190 and 192 disengage from normally closed contacts 70 and 76, respectively, and close against corresponding normally open contacts 124 and 126, respectively, so as to operatively connect corresponding loads to generator 44.

With circuit breakers 116 and 120 toggled to their on-positions, current flows through magnetic coil K2 of power relay 79 such that the magnetic coil K2 becomes magnetized and attracts movable contacts 194 and 196 within power relay 79. As a result, movable contacts 194 and 196 disengage from normally closed contacts 72 and 74, respectively, and close against corresponding normally open contacts 132 and 134, respectively, so as to operatively connect corresponding loads to generator 44.

With circuit breaker 122 toggled to its on-position, current flows through magnetic coil K1 of power relay 92 such that the magnetic coil K1 becomes magnetized and attracts movable contacts 198 and 200 within power relay 92. As a result, movable contacts 198 and 200 disengage from normally closed contacts 88 and 90, respectively, and close against corresponding normally open contacts 140 and 142, respectively, so as to operatively connect a corresponding load to generator 44.

In response to the restoration of power from utility source 42, monitoring circuit 188 stops the internal combustion engine of the generator 44. By stopping the internal combustion engine, the electrical generator of generator 44 no longer generates power across lines 104 and 106 and current ceases to flow through magnetic coils K1, K2 and K3 of power relays 92, 79 and 77, respectively. As a result, movable contacts 190 and 192 of power relay 77 disengage from normally open contacts 124 and 126, respectively, and reclose against corresponding normally closed contacts 70 and 76, respectively, so as to operatively connect corresponding loads to utility source 42.

Similarly, movable contacts 194 and 196 disengage from normally open contacts 132 and 134, respectively, and reclose against corresponding normally closed contacts 72 and 74, respectively, so as to operatively connect corresponding loads to utility source 42. In addition, movable contacts 198 and 200 disengage from normally open contacts 140 and 142, respectively, and reclose against corresponding normally closed contacts 88 and 90, respectively, so as to operatively connect a corresponding load to utility source 42. Thereafter, monitoring system 188 continues to monitor the power supplied by the utility source 44 and repeats the above-described process if a power outage from utility source 42 is detected.

Figure 5:
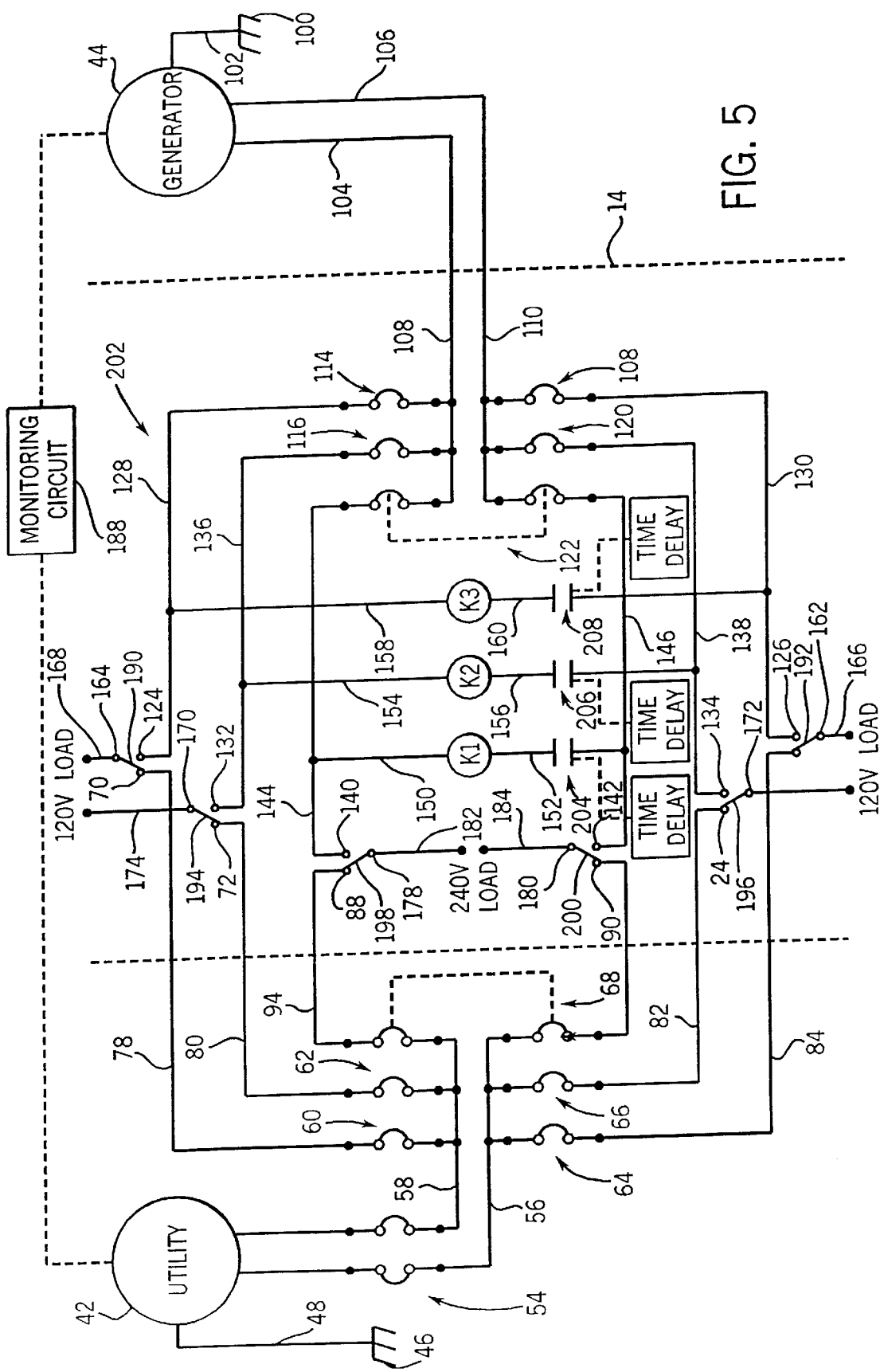
FIG. 5 is a schematic view of a second embodiment of the transfer mechanism of the present invention.

Referring to FIG. 5, an alternate embodiment of the transfer mechanism is shown. The alternate embodiment of the transfer mechanism is generally designated by the reference numeral 202. Transfer mechanism 202 is identical in structure to transfer mechanism 10 with the exception of time delay switches 204, 206 and 208 as hereinafter described. As such, common reference characters will be utilized.

In order to sequentially bring the various loads on line with generator 44, a first time delay switch 204 is positioned between magnetic coil K1 of power relay 92 and normally open contact 140; a second time delay switch 206 is positioned between magnetic coil K2 of power relay 79 and normally open contact 134; and a third time delay switch 208 is positioned between magnetic coil K3 of power relay 77 and normally open contact 126. As generator 44 is started as heretofore described, time delay switches 204, 206 and 208 are normally open so as to prevent the flow of current through magnetic coils K1, K2 and K3, respectively. Thereafter, time delay switches 204, 206 and 208 are sequentially closed over a predetermined time period in order to allow for the flow of current through corresponding magnetic coils K1, K2 and K3, respectively. As current flows through each magnetic coil K1, K2 and K3, various loads are operatively connected to generator 44 in the matter heretofore described with respect to transfer switch 10.

Further, in the second embodiment, it can be appreciated to utilize DC control relays in place of power relays 77, 79 and 92 and driving them directly using staggered delays.

Various modes of carrying out the invention are contemplated as being within the scope of the following claims particularly pointing out and distinctly claiming the subject matter which is regarded as the invention.

We claim:

1. In a transfer mechanism for transferring the supply of power to a load between a generator which generates power when started and a utility source, the transfer mechanism monitoring the power supplied by the utility source and starting the generator in response to a power outage from the utility source, the improvement comprising:

a relay having a utility input operatively connected to the utility source, a generator input and a coil operatively connected to the generator, and an output operatively connected to the load, wherein the inputs are selectively connected to the output in response to the application of power to the coil by the generator.

2. The improvement of claim 1 wherein the relay includes a movable contact, the movable contact being movable between a first position interconnecting the utility input and the output and a second position interconnecting the generator input and the output in response to the application of power to the coil by the generator.

3. The improvement of claim 2 wherein the movable contact is in the second position when power is applied to the coil.

4. The improvement of claim 2 wherein the relay includes a time-delay switch interconnecting the generator input and the output of the relay, the time-delay switch delaying movement of the movable contact to the second position in response to the application of power to the coil.

5. A transfer mechanism for transferring the supply of power between a generator and utility source, comprising:

a monitoring system for monitoring the power supplied by the utility source, the monitoring system starting the generator in response to a power outage from the utility source and stopping the generator in response to the restoration of power from the utility source; and an electromagnetic switch having a utility input connectable to the utility source, generator input connectable to the generator, an output connectable to a load, and a movable contact for selectively interconnecting one of the inputs to the output in response to the generation of power by the generator.

6. The transfer mechanism of claim 5 wherein the movable contact being movable between a first position interconnecting the utility input and the output and a second position interconnecting the generator input and the output.

7. The transfer mechanism of claim 6 further comprising a selection structure for moving the movable contact between the first and second positions.

8. The transfer mechanism of claim 7 wherein the selection structure includes a coil operatively connected to the generator, the coil urging the movable contact to the second position in response to the generation of power by the generator.

9. The transfer mechanism of claim 8 further comprising a time-delay switch interconnecting the generator input and the output of the electromagnetic switch, the time-delay switch delaying the supply of power from the generator to the load at the starting of the generator by the monitoring system.

10. The transfer mechanism of claim 8 wherein the selection structure urges the movable contact to the first position when the generator is stopped.

11. A transfer mechanism for transferring the supply of power between a generator which generates power when started and utility source, comprising:

a monitoring system for monitoring the power supplied by the utility source, the monitoring system starting the generator in response to a power outage from the utility source and stopping the generator in response to the restoration of power from the utility source;

a plurality of relays, each relay having:
 a utility input;
 a generator input;
 an output connectable to a corresponding load;
 a movable contact movable between a first position interconnecting the utility input and the output and a second position interconnecting the generator input and the output; and
 a coil connectable to the generator, the coil urging the movable contact into the second position in response to the generation of power by the generator;

a plurality of generator circuit breakers, each generator circuit breaker interconnecting the generator to the generator input of a corresponding relay; and a plurality of utility circuit breakers, each utility circuit breaker interconnecting the utility source to the utility input of a corresponding relay.

12. The transfer mechanism of claim 11 further comprising a plurality of time-delay switches, each time-delay switch interconnecting the generator input and the output of a corresponding relay so as to delay the supply of power from the generator to the corresponding load interconnected to the output when the generator is started.

13. The transfer mechanism of claim 12 wherein each time-delay switch delays the supply of power to each corresponding load for a predetermined time period such that power is supplied to each load in a predetermined sequential order.

14. The transfer mechanism of claim 11 wherein each relay includes a biasing structure for biasing the movable contact to the first position.

15. The transfer mechanism of claim 11 wherein at least one of the relays includes:
   a second utility input;
   a second generator input;
   an second output connectable to a corresponding load;
   a second movable contact movable between a first position interconnecting the second utility input and the second output and a second position interconnecting the second generator input and the second output; and
   a second coil connectable to a generator, the second coil urging the second movable contact into the second position in response to the generation of power by the generator.

16. In a transfer mechanism for transferring the supply of power to a load between a generator which generates power when started and a utility source, the transfer mechanism monitoring the power supplied by the utility source and starting the generator in response to a power outage from the utility source, the improvement comprising:
   a relay having a utility input operatively connected to the utility source, a generator input and a coil operatively connected to the generator, and an output operatively connected to the load, wherein the inputs are selectively connected to the output in response to the application of power to the coil by the generator; and
   a circuit breaker interconnecting the generator input of the relay, the circuit breaker having a first setting isolating the generator input from the generator and a second setting protecting the relay against an overload by the generator.

17. In a transfer mechanism for transferring the supply of power to a load between a generator which generates power when started and a utility source, the transfer mechanism monitoring the power supplied by the utility source and starting the generator in response to a power outage from the utility source, the improvement comprising:
   a relay having a utility input operatively connected to the utility source, a generator input and a coil operatively connected to the generator, and an output operatively connected to the load, wherein the inputs are selectively connected to the output in response to the application of power to the coil by the generator, the relay further having a second utility input operatively connected to the utility source, a second generator input operatively connected to the generator, a second output operatively connected to a second load, and a second coil, one of the second inputs being selectively connected to the second output in response to the application of power to the second coil by the generator.

18. A transfer mechanism for transferring the supply of power between a generator and utility source, comprising:
   a monitoring system for monitoring the power supplied by the utility source, the monitoring system starting the generator in response to a power outage from the utility source and stopping the generator in response to the restoration of power from the utility source; and
   an electromagnetic switch having a utility input connectable to the utility source, generator input connectable to the generator, an output connectable to a load, and a movable contact for selectively interconnecting one of the inputs to the output in response to the generation of power by the generator; and
   a generator breaker interconnecting the generator to the generator input of the electromagnetic switch, the generator circuit breaker having a first setting isolating the generator input from the generator and a second setting protecting the electromagnetic switch against an overload by the generator.

19. A transfer mechanism for transferring the supply of power between a generator and utility source, comprising:
   a monitoring system for monitoring the power supplied by the utility source, the monitoring system starting the generator in response to a power outage from the utility source and stopping the generator in response to the restoration of power from the utility source;
   an electromagnetic switch having a utility input connectable to the utility source, generator input connectable to the generator, an output connectable to a load, and a movable contact for selectively interconnecting one of the inputs to the output in response to the generation of power by the generator; and
   a utility circuit breaker interconnecting the utility source to the utility of the electromagnetic switch, the utility circuit breaker having a first setting isolating the utility input from the utility source and a second setting protecting the electromagnetic switch against an overload from the utility source.

20. A transfer mechanism for transferring the supply of power between a generator and utility source, comprising:
   a monitoring system for monitoring the power supplied by the utility source, the monitoring system starting the generator in response to a power outage from the utility source and stopping the generator in response to the restoration of power from the utility source;
   an electromagnetic switch having a utility input connectable to the utility source, generator input connectable to the generator, an output connectable to a load, and a movable contact for selectively interconnecting one of the inputs to the output in response to the generation of power by the generator; and
   a second electromagnetic switch, the second electromagnetic switch including a second utility input connectable to the utility source, a generator input connectable to the generator, an output connectable a second load, and a movable contact for selectively interconnecting one of the inputs to the output in response to the generation of power by the generator.

* * * * *